United States Patent
Briggs

(10) Patent No.: US 7,043,723 B2
(45) Date of Patent: *May 9, 2006

(54) RUN-TIME ADDITION OF INTERFACES

(75) Inventor: Robin Briggs, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/123,778

(22) Filed: Apr. 15, 2002

(65) Prior Publication Data

US 2004/0015944 A1    Jan. 22, 2004

Related U.S. Application Data

(63) Continuation of application No. 09/216,683, filed on Dec. 18, 1998, now Pat. No. 6,397,384.

(51) Int. Cl.
*G06F 9/44* (2006.01)

(52) U.S. Cl. .................. 717/165; 717/162; 717/108; 719/332

(58) Field of Classification Search ........ 717/162–167, 717/106, 108; 719/332
See application file for complete search history.

(56) References Cited

U.S. PATENT DOCUMENTS

| | | | | |
|---|---|---|---|---|
| 5,339,430 A | * | 8/1994 | Lundin et al. ............... | 717/1 |
| 5,493,680 A | * | 2/1996 | Danforth ................... | 717/108 |
| 5,794,038 A | * | 8/1998 | Stutz et al. ................ | 709/203 |
| 5,872,973 A | * | 2/1999 | Mitchell et al. ............ | 719/332 |
| 5,983,016 A | * | 11/1999 | Brodsky et al. ............ | 717/1 |
| 5,987,242 A | * | 11/1999 | Bentley et al. ........ | 395/500.34 |
| 6,016,392 A | * | 1/2000 | Jordan ..................... | 395/682 |
| 6,195,791 B1 | * | 2/2001 | Carlson et al. ............ | 717/100 |
| 6,262,729 B1 | * | 7/2001 | Marcos et al. ............ | 345/744 |
| 6,263,379 B1 | * | 7/2001 | Atkinson et al. .......... | 709/332 |
| 6,289,500 B1 | * | 9/2001 | Baxter et al. ............. | 717/108 |
| 6,397,384 B1 | * | 5/2002 | Briggs ..................... | 717/165 |
| 6,405,363 B1 | * | 6/2002 | Carlson et al. ............ | 717/100 |
| 6,564,368 B1 | * | 5/2003 | Beckett et al. ............ | 717/113 |
| 6,810,516 B1 | * | 10/2004 | Lauris ..................... | 717/105 |
| 6,845,503 B1 | * | 1/2005 | Carlson et al. ............ | 717/166 |

FOREIGN PATENT DOCUMENTS

EP    0 603 880    6/1994

OTHER PUBLICATIONS

IBM Techical Disclosure Bulletin, 'Inter-Program Binding', vol. 37, No. 12, pp. 415-420, Dec. 1994.*
Don Box, "Essential COM," Addison-Wesley Object Technology Series.

(Continued)

*Primary Examiner*—Wei Y. Zhen
*Assistant Examiner*—Qamrun Nahar
(74) *Attorney, Agent, or Firm*—Fish & Richardson P.C.

(57) ABSTRACT

Methods and apparatus implementing a technique for adding an interface to a boss object at run-time. A boss object includes one or more interfaces and each interface has a corresponding implementation class. In general, in one aspect, the technique includes: reading a first boss class having a first interface, defined in a first software component; reading a second interface, defined in a separate second software component; and binding the second interface to the first boss class, so that instantiating the first boss class creates a first boss object including the first interface and the second interface.

4 Claims, 7 Drawing Sheets

OTHER PUBLICATIONS

Dale Rogerson, "Inside COM, Microsoft's Component Object Model," Microsoft Press 1997.
"Microsoft Component Object Model (COM): A Technical Overview of COM", found in http://www.microsoft.com/com/wpaper/Com_modl.asp, download date Dec. 8, 1998.
"Microsoft COM-Based Technologies W . . . nt Services, A Technology Overview", found in http://www.microsoft.com/com/wpaper/compsvcs.asp, download date Dec. 8, 1998.
"Microsoft COMponents White Paper—Creating COM Plug-In Components", found in http://www.microsoft.com/com/components.default.asp, download date Dec. 8, 1998.
Mezini M: "Maintaining the Consistency of Class Libraries During Their Evolution," ACM Sigplan Notices, US, Association for Computer Machinery, New York, vol. 32, NR. 10, pp. 1-21 XP000723417, ISSN: 0362-1340.
IBM Technical Disclosure Bulletin, Inter-Program Binding', vol. 37, No. 12, pp. 415-420, Dec. 1994.

* cited by examiner

RUN-TIME ADDITION OF INTERFACES

REFERENCE TO RELATED APPLICATIONS

This is a continuation of U.S. application Ser. No. 09/216,683, filed Dec. 18, 1998 now U.S. Pat. No. 6,397,384, (allowed), which is incorporated herein by reference.

BACKGROUND

The invention relates to extending functionality at run-time to computer program objects.

Conventional software applications make use of independent modular software components, sometimes referred to as "plug-ins". These plug-ins provide extensibility to the functionality of the software application. Typically, when an application initially begins execution, a plug-in capable software application checks for available plug-ins and determines available functionality. In some application programs, checking for plug-ins may be performed dynamically, while the program is running. An example of a conventional software application which makes use of plug-ins is Adobe® Acrobat®.

A disadvantage of plug-ins is that plug-ins typically are independent of one another and do not make use of the program code contained within other plug-ins. Interaction between plug-ins is typically managed at a higher level by the application program. As a result, while a plug-in may make use of functions contained in another plug-in, the plug-in does not include actual program code stored in another plug-in. Similarly, plug-ins are not able to modify or add to the content of one another.

An example of a component programing model is the Microsoft® Component Object Model ("COM"). COM makes use of software components similar to the plug-ins described above. The software components include definitions written in an object-oriented programming ("OOP") language, such as C++. A software component for COM defines one or more COM classes. Instances of COM classes are COM objects. These COM objects are used to build applications Typically, an application program loads one or more software components containing particular implementations of operations used within the application program. Each of the software components is compiled separately before the application program executes. At run-time the available software components are integrated. Software components in COM follow conventions allowing components to be implemented in different languages, such as C++, Pascal, or LISP. The software components add to the functionality of the application program by defining classes and methods which can in turn be used by the application program. However, like conventional plug-ins, the COM classes defined in the software components cannot modify one another. While one COM class can inherit from another COM class, COM classes are not able to alter other COM classes. As a result, the functionality provided by different COM objects is limited to whatever functionality is provided by the compiled form of the corresponding COM classes. To extend the functionality of a COM object, the software component defining that particular COM object's COM class is typically rewritten and then recompiled. COM is described in many sources, including in Box, Don, "Essential COM", Addison-Wesley Pub. Co., 1998.

SUMMARY

The invention provides methods and apparatus implementing a technique for adding an interface to a boss object at run-time through an object manager. A boss object includes one or more interfaces and each interface has a corresponding implementation class. In general, in one aspect, the technique includes: reading a first boss class having a first interface, defined in a first software component; reading a second interface, defined in a separate second software component; and binding the second interface to the first boss class, so that instantiating the first boss class creates a first boss object including the first interface and the second interface.

In another aspect, the technique includes: providing an add-in class indicating a boss class in a separate software component, where the add-in class includes a supplemental interface which can be bound to the boss class; and indicating that a boss object includes the supplemental interface, when the boss object is queried, where the boss object is created by instantiating the boss class.

Advantages of the invention include one or more of the following. The invention provides extension of boss classes at run-time or dynamically. The invention can be used to add a new boss class, to add interfaces to a boss class, to add interfaces to a set of classes by adding the interfaces to a base class from which that set inherits, to reuse code for implementation classes provided in separate software components, to instantiate a boss class, and to query for an interface using an interface identifier.

DETAILED DESCRIPTION

Figure 1:
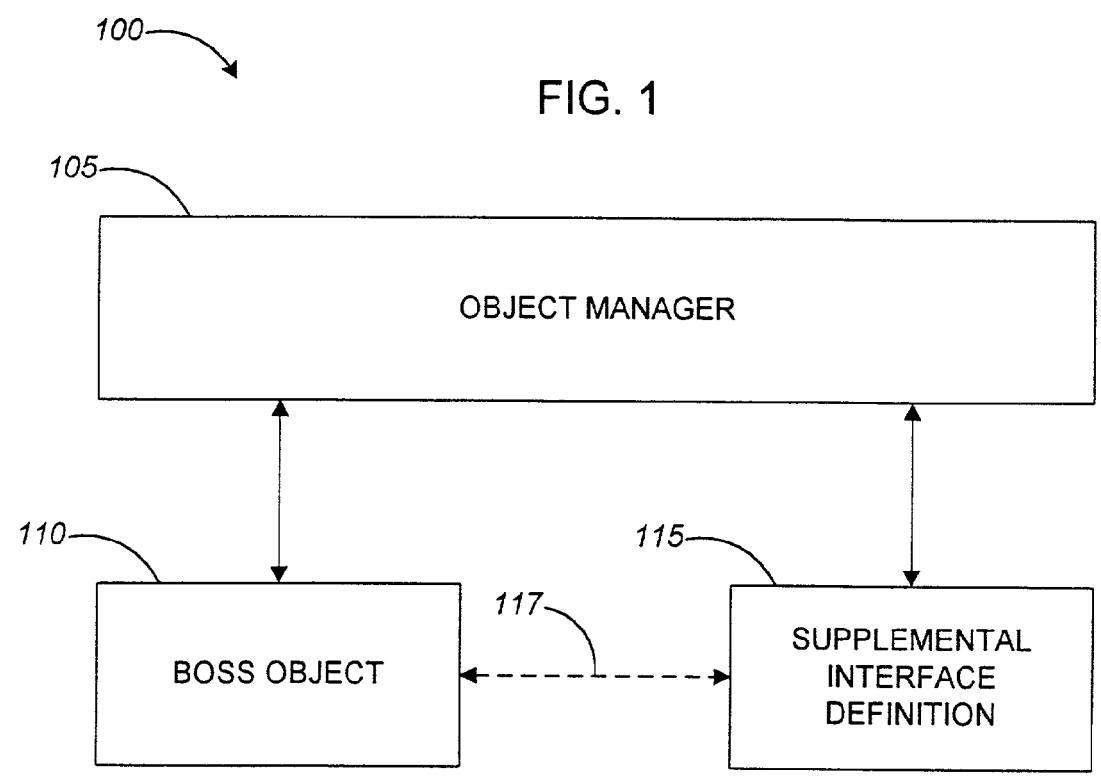
FIG. 1 is a block diagram of an object model according to the invention.
Figure 2:
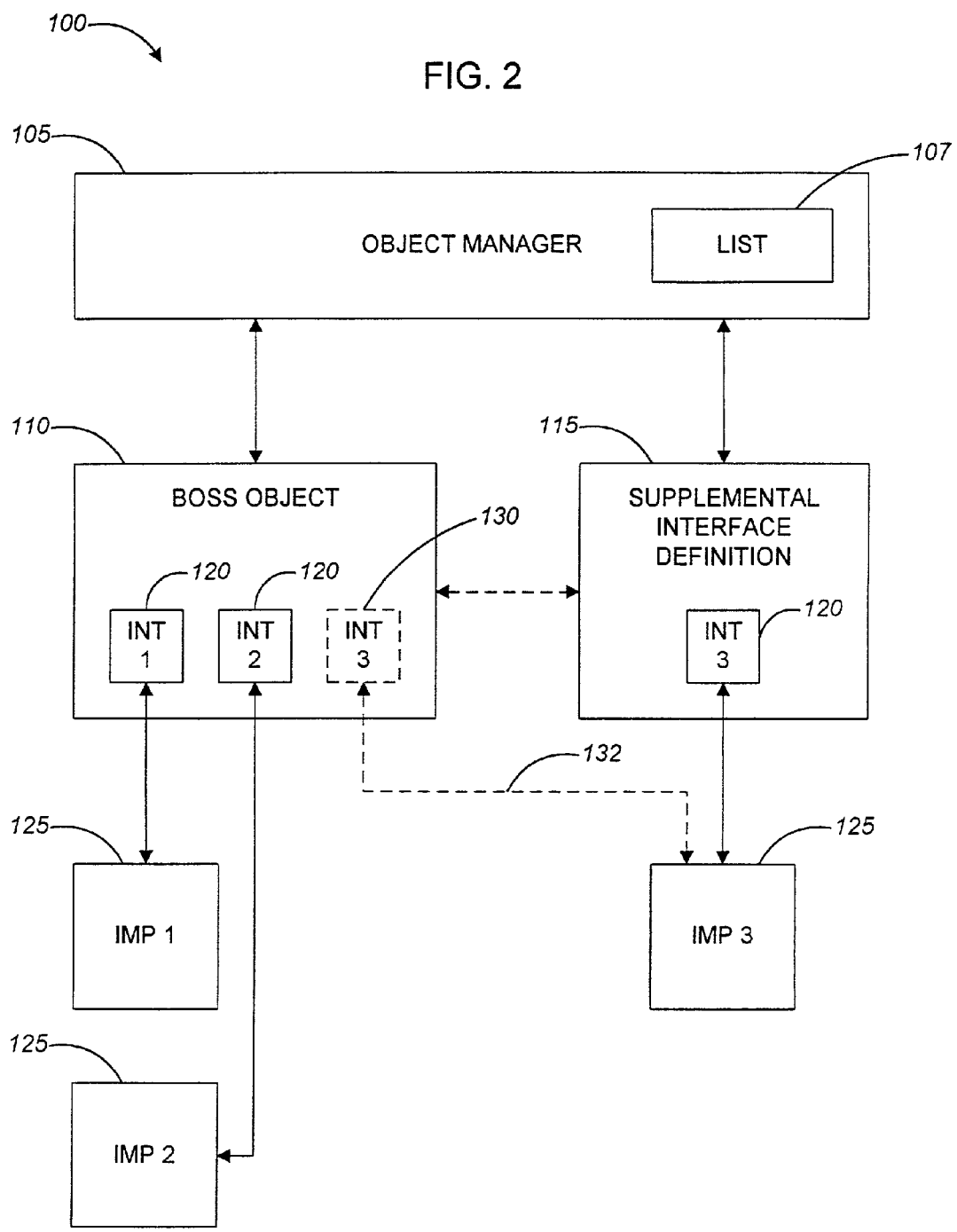
FIG. 2 is a block diagram of an object model showing interfaces and implementation objects.
Figure 3:
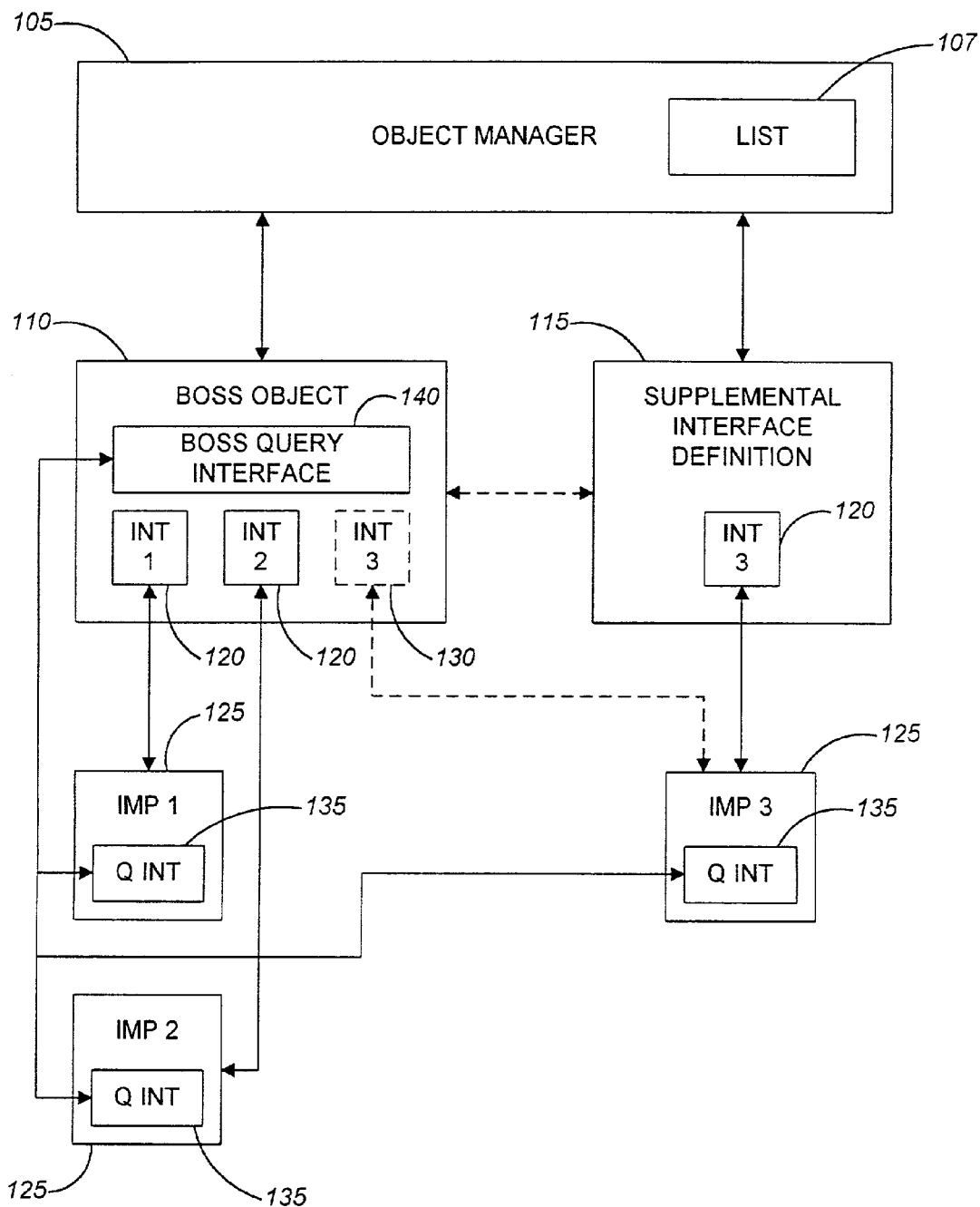
FIG. 3 is a block diagram of an object model showing query interface methods.
Figure 4:
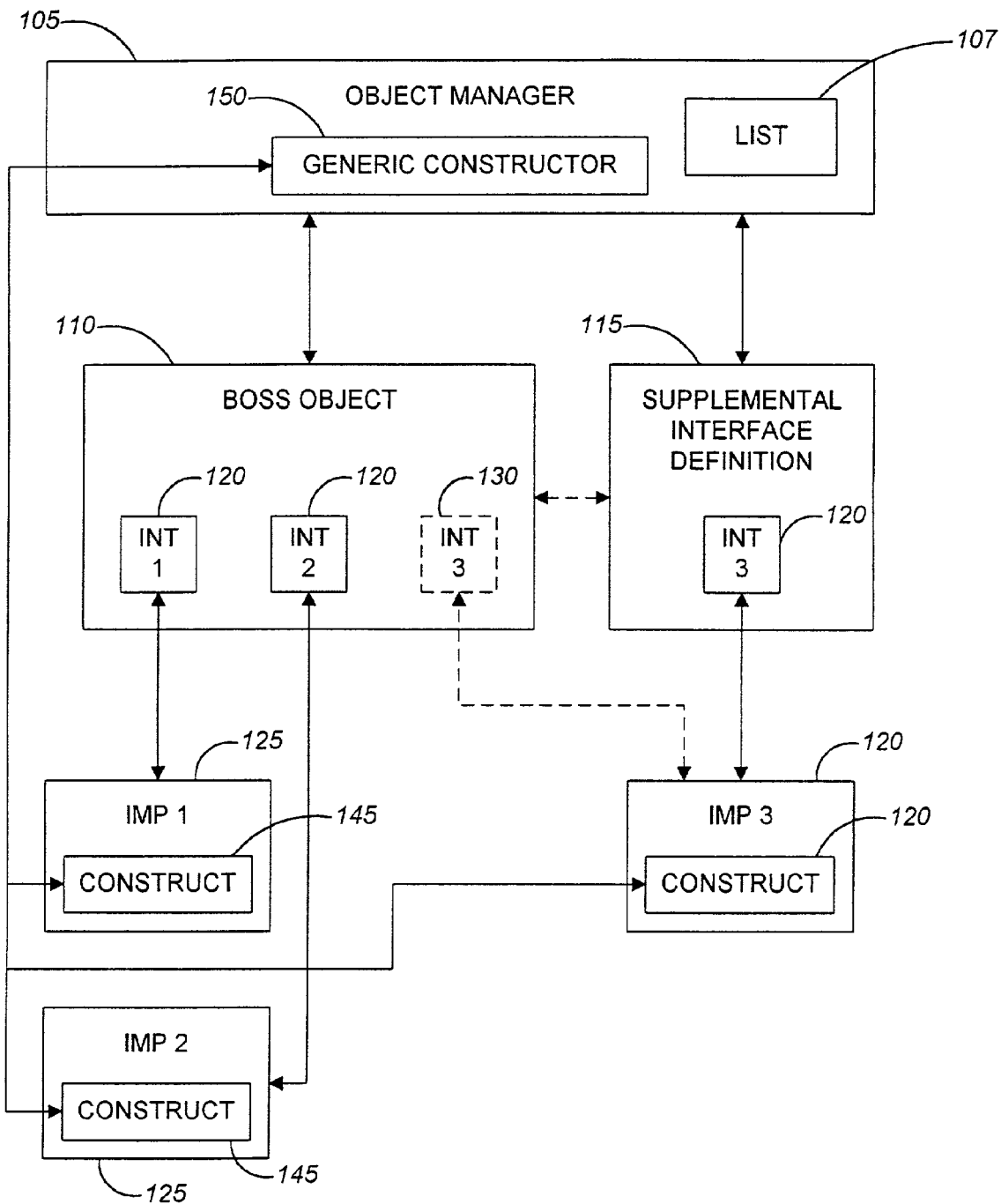
FIG. 4 is a block diagram of an object model showing constructors.
Figure 5:
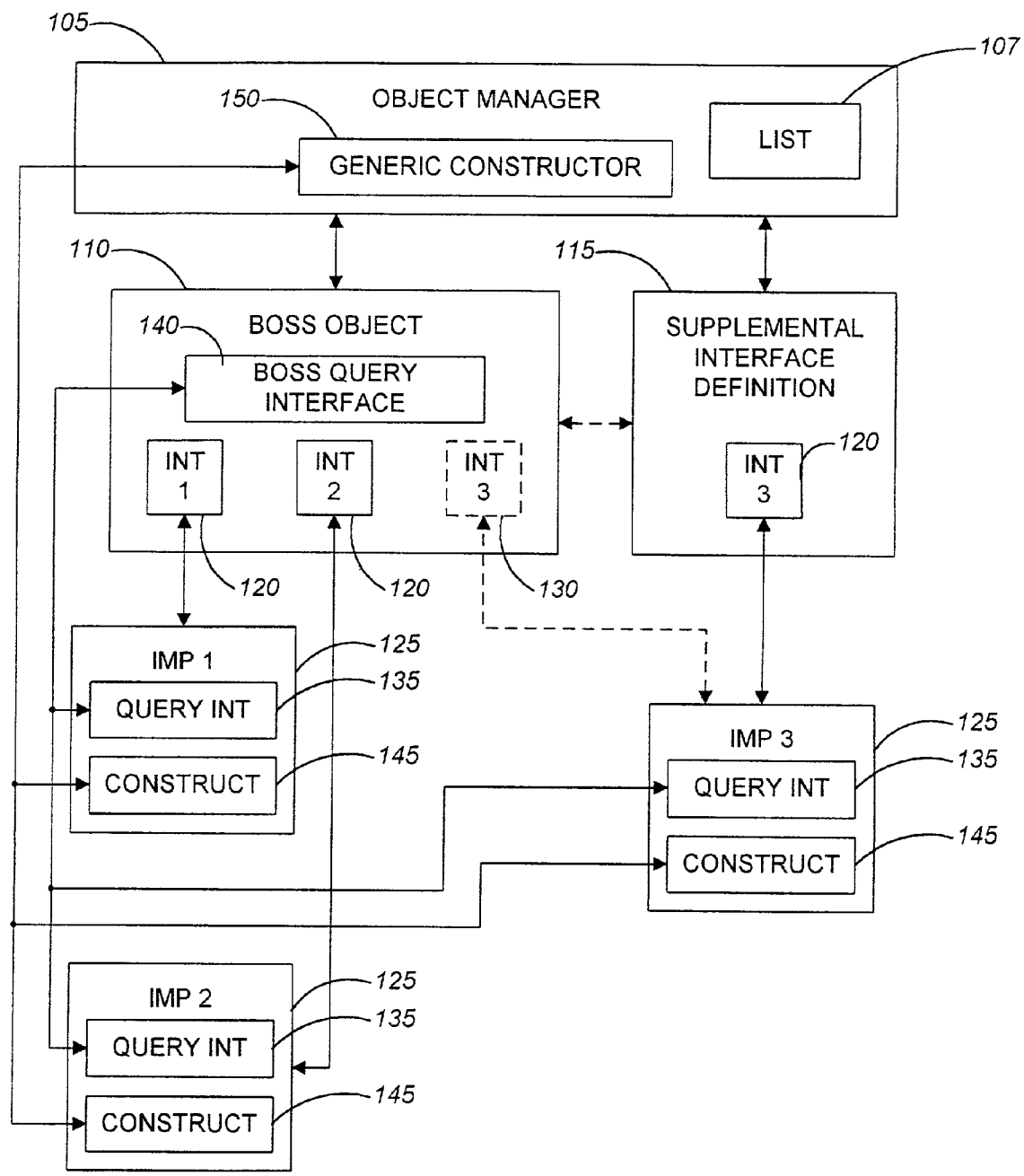
FIG. 5 is a block diagram of an object model.

As shown in FIGS. 1–5, in an object model 100 according to the invention, an object manager 105 provides a connection between a boss object 110 and an add-in class 115 to modify an available set of interfaces 120 for the boss object 110. The object manager 105 in effect adds the supplemental interfaces 120 of an add-in class 115 to the corresponding boss class at run-time to extend or modify the functionality of resulting boss objects 110. FIGS. 1–4 present different views of the object model 100, separated for clarity. A unified view is shown in FIG. 5.

Interfaces 120 are pure virtual classes specifying one or more methods. As pure virtual classes, interfaces 120 do not provide programming code implementing the specified methods, but rather provide a format for the specified methods (e.g., parameters). Implementation classes provide the code implementing the methods. Each interface 120 has a corresponding implementation class which inherits from the interface 120. Each interface 120 has a unique interface identifier and each implementation class has a unique implementation identifier. Each implementation class can be instantiated as a separate implementation object 125, as needed.

Each interface 120 inherits from a common base interface class. This base class virtually defines a query interface method 135 for determining available interfaces, as described below. Accordingly, each interface 120 and each implementation class includes this query interface method 135. Each implementation class provides the code implementing the corresponding query interface method 135.

A boss class defines a set of zero or more interfaces 120, an implementation class for each of the interfaces 120, and methods for a boss object 110. A boss class includes a class ID which is unique for the boss class. The interfaces 120 define the functionality available to the boss object 110. The interfaces 120 of a boss class are selected according to the application, such as a group of related operations. A boss class manages the operation and interrelation of a group of interfaces 120 and so acts as a manager or "boss."

A boss class is not a class in the ordinary OOP sense. A single object does not represent an instance of a boss class. A boss class is represented by a combination of a boss object 110 and implementation objects 125. A boss class is instantiated through the object manager 105. When instantiating a boss class, the object manager 105 creates a boss object 120 and supplies the boss object 110 with a reference to the interfaces 120 available for the boss class.

A boss object 110 manages access to, and operation of, the implementation objects 125 for the corresponding interfaces 120 of that boss object 110. The boss object 110 receives a reference to the set of available interfaces 120 for the boss object 110 from the object manager 105. The boss object 110 does not contain the methods of the implementation classes for the boss class. Rather, the boss object 110 includes a list of references for implementation objects 125. The boss object 110 also includes a reference to the object manager.

An implementation class is instantiated before the methods for that implementation can be used. Thus, the implementation class can be instantiated on demand or when the boss class is instantiated. When an implementation class is instantiated, as described below, a separate implementation object 125 is created and a reference to the implementation object 125 is added to the list of the boss object 110. The implementation object 125 also receives a reference to the boss object 110 when the implementation object 125 is initially created. The implementation object 125 can request a list of available interfaces 120 for the corresponding boss object 110 from the object manager 105. Because a list of all the available interfaces 120 for a boss object 110 can be requested, the boss classes are "open" and do not hide interfaces.

All boss classes inherit from a common base boss class. The base boss class virtually defines a boss query interface method 140. Each boss class provides the code implementing the corresponding boss query interface method 140 as part of the definition of the boss object 110. Thus, the boss query interface method 140 is a method of the boss object 110. The boss query interface method 140 returns a value regarding a particular interface 120 to indicate whether the interface 120 is supported by the boss object 110. The boss object 110 can provide this information because the object manager 105 provides a reference to the list of available interfaces 120 to the boss object 110 when the boss class is instantiated, as noted above. The query interface methods 135 of the implementation objects 125 defer to the boss query interface method 140 so that any implementation object 125 can be queried for the available interfaces 120 of the boss object 110 for that implementation object 125, as described below.

An add-in class 115 specifies a boss class and defines one or more interfaces 120 to add to that boss class. The add-in class 115 defines interfaces 120 in a similar manner as a boss class, however, the add-in class 115 is not instantiated. The add-in class is a partial definition. The add-in class 115 adds interfaces 120 to the available set of interfaces 120 for the boss object 110. While the actual code defining the boss class is unaffected, the object manager 105 supplies the interfaces 120 defined in the boss class and interfaces 120 defined in any add-in classes 115 associated with that boss class to the boss object 110. A dashed line 117 represents a virtual connection between the boss object 110 and the add-in class 115, reflecting the association of the interfaces 120 of the add-in class 115 with the boss class. The add-in class 115 also defines an implementation class for each interface 120 of the add-in class 115, similar to a boss class. The implementation class and implementation object 125 for an add-in class 115 operates in the same way as those defined in a boss class. In an alternative embodiment, an add-in class 115 can modify the available interfaces 120 of a boss class. Such a modifying add-in class 115 can include interfaces 120 which override interfaces 120 of the boss class or can remove interfaces 120 from the boss class.

The object manager 105 keeps track of the available interfaces 120 for each boss class. When an application program using the object model 100 initially executes, the object manager 105 registers each available boss class and forms a list 107 of available interfaces 120. The list 107 is organized to indicate a set of available interfaces 120 for each boss class. The object manager 105 determines the available interfaces 120 from boss classes and add-in classes 115 defined in the application program and any software components loaded at run-time. Because the object manager 105 forms the list 107 of available interfaces at run-time, the object model 100 provides for run-time addition of interfaces 120 to boss classes. Thus, the available set of interfaces for a boss object 110 can change from one execution of the application program to the next according to what software components are loaded.

After the object manager 105 has formed the list 107, the object manager 105 instantiates each boss class. As noted above, this instantiation creates a boss object 120 for each boss class with a reference to the set of available interfaces for that boss class, but does not create implementation objects 125. Because the set of available interfaces 120 for a boss object 110 is determined according to the list 107 of the object manager 105 formed at run-time, the set of interfaces available to the boss object 110 can be different from the interfaces 120 defined in the boss class. The boss object 110 includes each of the interfaces 120 defined in the boss class as well as any interfaces 120 defined in any corresponding add-in classes 115. This addition of an interface 120 to the boss object 110 is indicated by the dashed box 130 for INT 3 as well as the dashed line 132 connecting INT 3 130 with the implementation 125 for INT 3. In addition, a boss class can inherit from another boss class. A boss object 110 of the derived boss class includes the set of available interfaces 120 of the parent boss class, determined at run-time. In addition, a derived boss class may override the parent boss class.

In one embodiment, the object manager 105 organizes the available interfaces 120 defined by boss classes and add-in classes 115 into groups similar to classes. This organization allows the object manager 105 to provide an inheritance capability for these groups of interfaces 120. For example, a first boss class includes an interface A and an add-in class 115 includes an interface B. The object manager 105 groups these interfaces A and B into a single group A+B. The object manager 105 can then use the group A+B to indicate a set of available interfaces 120. A second boss class can be defined to have the same interfaces 120 as are available in this new group A+B. As a result, the interfaces 120 available to a boss object 110 of the second boss class depend on whether the add-in class 115 providing interface B is available at run-time or not. Alternatively, the software component defining the first add-in class 115 is replaced by a software component defining a second add-in class 115 providing interface C to the first boss class. As a result, the boss object 110 for the first boss class and the boss object 110 for the second boss class have available interfaces A and C. This organization can be achieved through multiple lists or with objects.

Each interface 120 includes a virtual definition of a query interface method 135 for the corresponding implementation object 125. As shown in FIG. 3, each implementation object 125 includes code implementing the query interface method 135. The query interface method 135 is used to determine the availability of interfaces 120 and access implementation objects 125, similar to the QueryInterface request in COM. To use the methods of an interface 120, a call to a query interface method of any implementation object 125 of the boss class including that interface 120 is made. This call can originate in an implementation object 125 or another object in the application program, as appropriate. When queried for a particular interface 120, the query interface method 135 returns either a reference to an implementation object 125 for the interface 120 or a null value indicating the interface 120 is unavailable. Alternatively, the query interface method 135 can return an error code along with or in place of the null value.

Because the available interfaces 120 of the boss object 110 are extendable at run-time, an implementation object 125 does not necessarily include information indicating the available interfaces 120. The boss object 110 does include this information. As noted above, the boss object 110 includes an implementation of a boss query interface method 140. Each of the query interface methods 135 in the implementation objects 125 rely upon the boss query interface method 140 for the corresponding boss object 110. The boss object 110 can access all of the interfaces 120 available to the boss object 110 through the list of available interfaces 120 supplied by the object manager 105. The boss query interface method 140 of the boss object 110 uses this list to respond to the query interface method 135 of the calling implementation object 125. Thus, the query interface methods 135 defer to the boss query interface method 140. The query interface methods 135 can be quite short, merely returning the result from the boss query interface method 140. This deferral allows the implementation objects 125 to remain independent of the interfaces 120 available for the boss object 110. Similarly, the implementation object 125 for an interface 120 defined in an add-in class 115 includes a query interface method 135 which defers to the boss query interface method 140. Thus, the result of calling a query interface method 135 depends upon which supplemental interfaces 120, if any, have been added through add-in classes 115 and the object manager 105. The object manager 105 in effect modifies the operation of the query interface methods 135 throughout the object model 100 at run-time.

When the query interface method 135 of an implementation object 125 is called, the query interface method 135 calls the boss query interface method 140 of the boss object 110 corresponding to the implementation object 125. The boss query interface method 140 checks the list of interfaces 120 available for the boss object 110. If the requested interface 120 is not available for the boss object 110, the boss query interface method 140 returns a null value. If the requested interface 120 is available, the boss query interface method 140 checks the list of instantiated implementation objects 125 for the boss object 110. If the implementation object 125 for the requested interface 120 has already been created, indicated by a reference to that implementation object 125 in the list, the boss query interface method 140 returns the reference. If the implementation object 125 has not yet been created, the boss query interface method 140 creates the implementation object 125 as described below, stores a reference to the new implementation object 125 in the list, and returns the reference. The query interface method 135 originally called then returns what was returned by the boss query interface method 140.

The reference to the implementation object 125 is of the type of the interface 120. Calls to the methods of the implementation object 125 through the reference can be made according to the interface 120. As described above, the actual code implementing the methods defined in the interface 120 is provided in the implementation class, which inherits from the interface 120. When a first class inherits from a second class, the first class can be used interchangeably as though it were of the second class. Because the interface 120 is a pure virtual class, and the implementation class inherits from the virtual interface, the implementation class supplies the code implementing the methods defined in the interface 120. The implementation class definitions override the virtual definitions provided in the interface 120 and define the operation of the methods when called.

This deferral allows dynamic querying for multiple types from a C++ module, and the types do not have to be related via inheritance. The available interfaces 120 for boss objects 110 can be evaluated using a query interface method 135 without knowing any details of the inheritance of the boss objects 110. This is especially useful because the available interfaces 120 for boss objects 110 are extensible at run-time, and so can vary between executions of the application program.

As shown in FIG. 4, each implementation class also includes a constructor 145. The object manager 105 includes a generic constructor 150. When a boss query interface method 140 needs to create an implementation object 125, the boss query interface method 140 sends a request to the generic constructor 150 including an identifier for the implementation class. The generic constructor 150 includes a list of each of the constructors 145 associated with that generic constructor 150, and in turn calls upon the constructor 145 corresponding to the implementation class to be instantiated. Thus, calls to create an implementation object 125 can be made in a generic manner without the caller using the specific details of the implementation class. Because implementation classes can be defined in separate software components, such as in add-in classes 115, the definitions of implementation classes are unavailable in other software components. The object manager 105, through its run-time gathering of available interfaces 120 into the list 107, serves as a common point for reference to available interfaces 120 and implementation classes. Any call to create an implementation object 125 is made through the object manager 105, which uses the generic constructor 150 to make the correct call to the constructor 145 of the corresponding implementation class.

When the boss class is de-instantiated, the boss object 110 is destroyed. The object manager 105 also deletes each of the implementation objects 125 included in the list of implementation objects 125 in the boss object 110. Destructor functions for each of the implementation classes are defined in a generic and specific pairing within the object manager and the specific implementation class, similar to the constructor functions.

Figure 6:
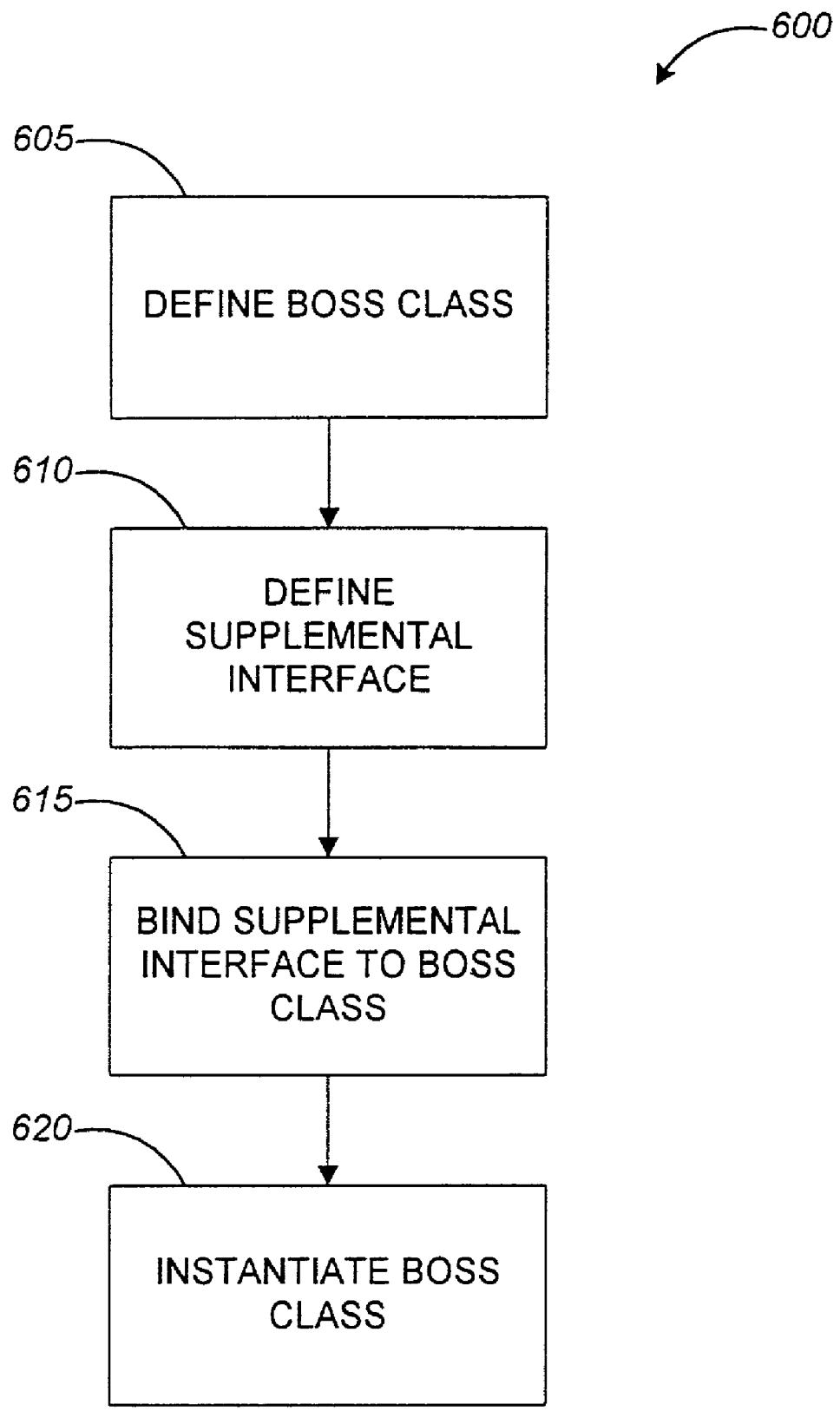
FIG. 6 is a flowchart of binding supplemental interfaces to a boss class.

As shown in FIG. 6 in a process 600 of adding an interface to a set of available interfaces for a boss object at run-time, a boss class is defined (step 605). An add-in class defines one or more interfaces to be added to the boss class (step 610). At run-time, the object manager reads the definitions of the boss class and the add-in class and binds the interfaces of the add-in class to the corresponding boss class (steps 615). The object manager binds the interfaces to the boss class by associating these interfaces from the add-in class with the interfaces defined in the boss class in a list, as described above. The object manager instantiates the boss class using the list (step 620). The resulting boss object includes a reference to the set of available interfaces for the boss class, as found in the list of the object manager. Similarly, the boss object includes a list for references to implementation objects corresponding to the available interfaces. Accordingly, the available interfaces of the boss object are determined at run-time and can be freely modified from one execution to the next of an application program without requiring recompilation of any of the software components. The available interfaces are determined by the boss classes and add-in classes supplied to the object model.

Figure 7:
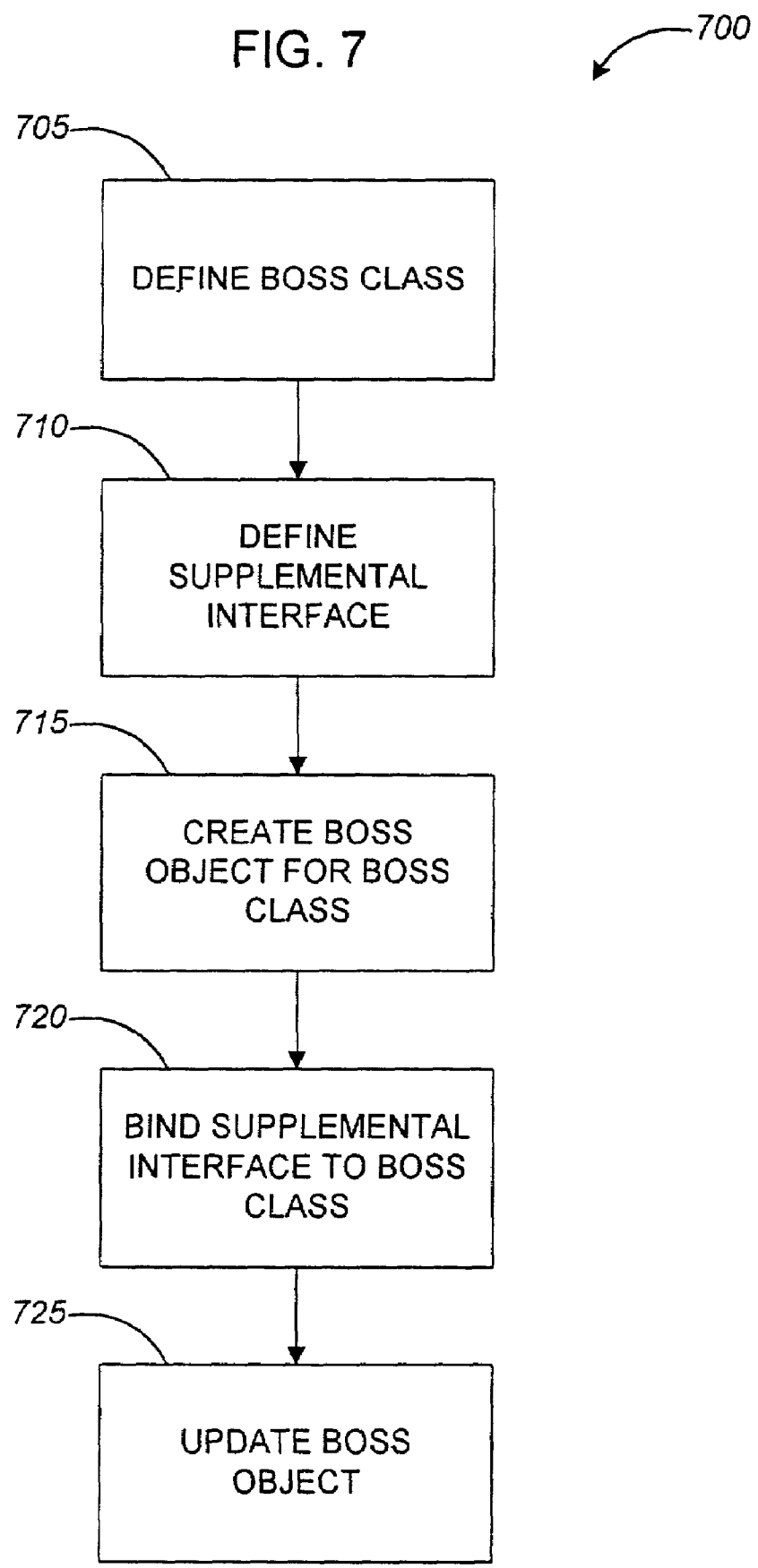
FIG. 7 is a flowchart of dynamically updating a boss object.

In an alternative embodiment, as shown in FIG. 7, in a process 700 of dynamically updating boss objects, a boss class is defined (step 705), and an add-in class including a supplemental interface is defined (step 710). The object manager checks periodically for available interfaces while the application program is running. For example, the object manager can check for available interfaces in a particular storage location such as a directory or software component defining supplemental interfaces. The object manager can check periodically, or the object manager can check at specified times such as according to user input. In this way, the object manger updates the list of available interfaces dynamically.

In the embodiment illustrated in FIG. 7, the object manager reads the definition of the boss class and instantiates the boss class (step 715) before the object manager has read the definition of the add-in class and updated the list to reflect the supplemental interface defined in step 710. The boss object created in step 715 does not include the supplemental interface defined in step 710, but only interfaces included in the boss class defined in step 705. At the next update of the list, the object manager reads the add-in class and recognizes the supplemental interface defined in step 710. The object manager incorporates the additional interface in the list, binding the interface to the boss class (step 720). While the supplemental interface defined in step 710 can be defined before the instance of the boss object is created in step 715, the inclusion of the supplemental interface defined in step 710 depends upon the binding of the interface to the boss class. As shown in FIG. 7, this binding does not occur until step 720 which is after the creation of the instance in step 715.

After binding the interface to the boss class through the list of the object manager, the object manager updates each boss object whose set of available interfaces has been modified (step 725). At this point, the boss object created in step 715 is updated by the object manager so that the boss object includes the interfaces defined in the boss class of step 705 as well as the supplemental interface defined in step 710. Alternatively, any instances created after the binding include the new supplemental interfaces while existing instances are unchanged. In one embodiment, the object manager maintains a dynamic list of available interfaces, and a boss object can check this list to determine what interfaces are available.

The order of definitions and creations shown in FIG. 7 is selected only to provide an example. Where boss objects are created after supplemental interfaces are bound to the corresponding boss class, the need for dynamic updating of those boss objects is not present. On the other hand, dynamic updating is useful if the supplemental interfaces available to a boss object can change after the boss object has been created. For example, in an application which accesses resources from different sites on a network, the available supplemental interfaces can vary depending on the current network connections. The network connections can be modified by user selection or other external factors, and so the available add-in classes can also vary. By dynamically checking and updating the lists of available interfaces in the object manager, boss objects can also be dynamically updated and maintained to reflect the most recent availability of supplemental interfaces. This allows for the dynamic modification of boss objects and accordingly the dynamic modification of the operation of the corresponding application program.

The application program as a whole can include multiple software components. The software components include definitions written in an object-oriented programming language, such as C++. The application program includes a core section of code forming a shell of the application program. Additional functionality of the application program, and perhaps the majority of the functionality, is defined in one or more software components loaded by the application program. The application program can load software components including plug-ins and shared libraries. For example, the object model can be defined separately from the application shell, such as in a shared library.

An object or portion of the application program or a software component can request that the object manager instantiate a boss class. In order to make this request, the requestor uses a reference to the object manager. The reference can be supplied directly to the requesting object or as a global variable accessible to the requester. For example, an object defined in a separate software component can access the object manager through a global variable made available while loading the software component. After receiving the pointer to the object manager, a request is sent to the object manager to instantiate the boss class.

The object model provides code sharing at a binary level. Boss classes can be defined in separate compiled software components. Similarly, an implementation class can be defined in a separate software component from a boss class or add-in class which has an interface for that implementation class. The object manager can create boss objects so that any portions (e.g., implementation classes) which are in unavailable software components are disabled, but the remainder of the boss object is created and available as appropriate. The generic constructor of the object manager allows calls to be made to create instances of implementation objects without any knowledge on the caller side of the internal structure of those implementations. This allows binary reuse of code by including a reference to the appropriate constructor, such as by supplying an implementation identifier.

In an alternative embodiment, boss objects can manage COM objects which have been modified to interact with the object model. The COM objects are opaque so the implementation classes defined by the COM class are hidden. However, the modification to the COM class allows the available interfaces for the COM object to be extended by add-in classes through the object manager and boss objects, as described above. One way of providing this modification is to have a COM object check with the object manager for the set of supplemental interfaces from add-in classes when the COM object is instantiated. As the COM object receives requests for the implementation objects of the supplemental interfaces, the COM object can request that the object manager create these implementation objects, as described above. Hence, with minimal modification, existing COM implementations of application programs and software components can be used with the object model.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one embodiment, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output. The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

The invention has been described in terms of particular embodiments. Other embodiments are within the scope of the following claims. For example, the steps of the invention can be performed in a different order and still achieve desirable results. The technique can be applied to a variety of programming environments, such as C++ or LISP. The object manager and application program utilizing the object model can be composed of an association of objects, such as COM or C++ objects. Software components can be loaded when the application program initially executes or while the application program is running. Boss classes can be defined in the application program or in separate software components. Add-in classes can be provided in separate software components relative to either or both of the application program and the definition of the boss object. The object manager can include one or more objects to implement the operations of the object manager. A derived boss class can selectively inherit, so that a subset of the available interfaces of the parent boss class can be inherited. A constructor for instantiating the boss class can be provided in the object manager or in the boss class. The list of available interfaces in the object manager can be a single unified list for all boss classes, or the object manager can maintain a separate list for each boss class. The query interface method can be implemented to return a list of available interfaces for the corresponding boss object. Objects created in the object model can be in a unified hierarchy. In this case, a root object is at the top of the hierarchy and all other objects in the hierarchy are accessible through the root object. The base interface class and the base boss class can be the same class. The object manager can be implemented as a single class where one instance is accessed by all boss classes. Alternatively, the object manager can be implemented as multiple classes, one class for each boss class. In this case, an instance of the class within the object manager for each boss class is created as appropriate.

What is claimed is:

1. A method of modifying a set of available interfaces, comprising:

reading a boss class from a compiled form of a compiled first software component that provides functionality by defining classes and methods that can be used by an application program, the boss class defining a first set of interfaces, each interface in the first set having a corresponding implementation class;

reading a second interface from a compiled form of a separately-compiled second software component that provides functionality by defining classes and methods that can be used by the application program, the second software component being compiled separately from the first software component, the second interface having a corresponding implementation class; and binding the second interface to the boss class, whereby a boss object created by instantiating the boss class after the binding includes the second interface.

2. A method, comprising:

providing a first boss class having a first interface, the first interface having a corresponding first implementation class;

providing a second interface, the second interface having a corresponding second implementation class; and binding the second interface to the first boss class dynamically at run-time, so that instantiating the first boss class creates a first boss object including the first interface and the second interface.

3. A method, comprising:

defining a boss class with a first set of interfaces;

defining a second set of interfaces as supplemental interfaces;

creating a first boss object by instantiating the boss class, where the first boss object includes the first set of interfaces;

binding the second set of supplemental interfaces to the boss class dynamically at run-time after having created the first boss object; and creating a second boss object by instantiating the boss class after binding the second set of supplemental interfaces to the boss class, the instantiation providing the second boss object with the first set of interfaces and the second interfaces.

4. A computer program stored on a computer-readable medium and including instructions operable to cause a computer to:

determine a set of available interfaces at run-time, the set including a first set of interfaces from a boss class and a second set of interfaces from an add-in class, wherein the boss class and the add-in class are in separately-compiled software components;

bind the second set of interfaces to the boss class dynamically at run-time; and after binding the second set of interfaces to the boss class, instantiate the boss class to create a boss object that includes the first set of interfaces and the second set of interfaces.

* * * * *

UNITED STATES PATENT AND TRADEMARK OFFICE
CERTIFICATE OF CORRECTION

| | | |
|---|---|---|
| PATENT NO. | : 7,043,723 B2 | Page 1 of 1 |
| APPLICATION NO. | : 10/123778 | |
| DATED | : May 9, 2006 | |
| INVENTOR(S) | : Robin Briggs | |

It is certified that error appears in the above-identified patent and that said Letters Patent is hereby corrected as shown below:

Column 12, line 5, after "second", insert --set of supplemental--.

Signed and Sealed this

Twelfth Day of September, 2006

JON W. DUDAS
*Director of the United States Patent and Trademark Office*